United States Patent [19]
Day et al.

[11] 3,869,178
[45] Mar. 4, 1975

[54] DEVICE FOR PREVENTING PRESSURE OR VACUUM BUILD-UP IN PNEUMATIC BRAKE SYSTEMS

[76] Inventors: Leon E. Day, 3027 Juca Ln., Memphis, Tenn. 38116; Amond B. Millican, Rt. 2, Box 200, Decaturville, Tenn. 38329

[22] Filed: Nov. 19, 1973

[21] Appl. No.: 417,219

[52] U.S. Cl. ..................... 303/67, 137/519, 303/86
[51] Int. Cl. .............................................. B60t 11/34
[58] Field of Search ..... 137/470, 471, 513.3, 513.7, 137/517, 519, 533; 303/81, 82, 86, 87, 66, 67

[56] References Cited
UNITED STATES PATENTS
1,906,165   4/1933   Leuchter ..................... 303/67 X
1,986,358   1/1935   Rasbridge ..................... 137/519

*Primary Examiner*—Duane A. Reger
*Attorney, Agent, or Firm*—John R. Walker, III

[57] ABSTRACT

A device having a body mounted on a pneumatic line leading from a pneumatic pump to a brake valve of a pneumatic brake system, including an air passage for allowing air to pass therethrough between the pneumatic pump and the brake valve through the pneumatic line, and having air bypasses leading to air valves for allowing any pressure or vacuum build-up in the pneumatic line while the pneumatic pump is not activated to be relieved therethrough.

3 Claims, 3 Drawing Figures

PATENTED MAR 4 1975                    3,869,178
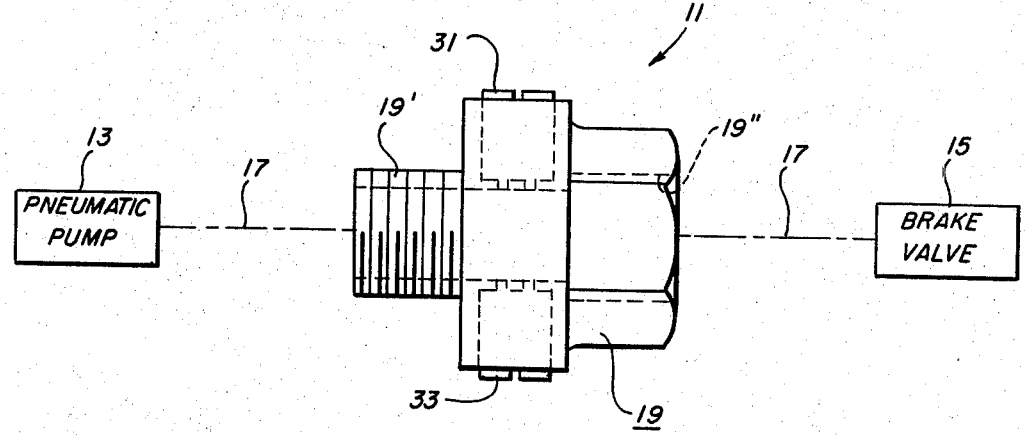
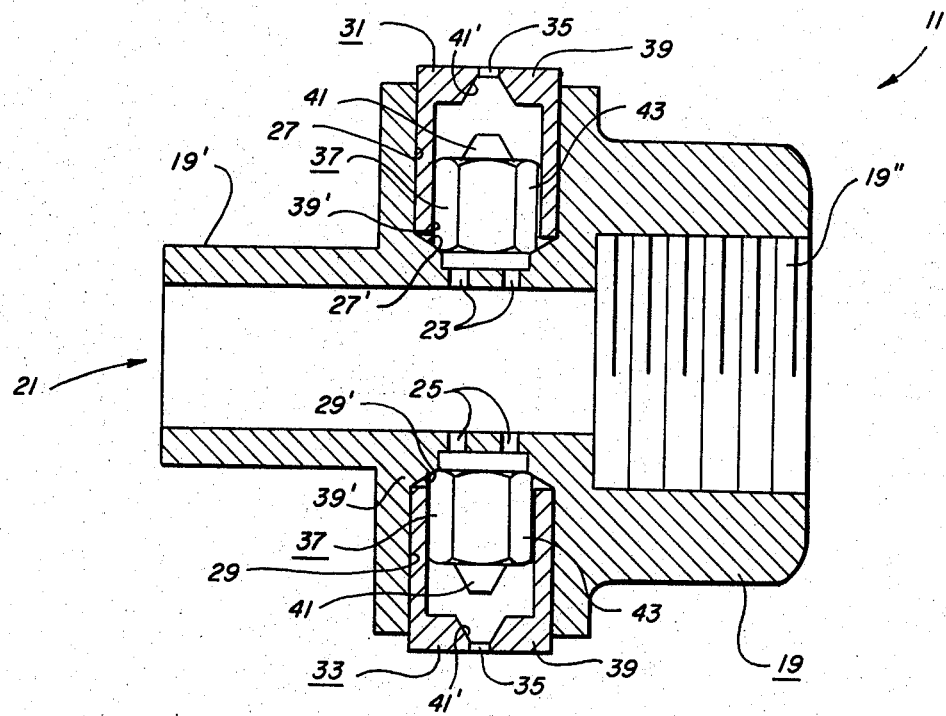
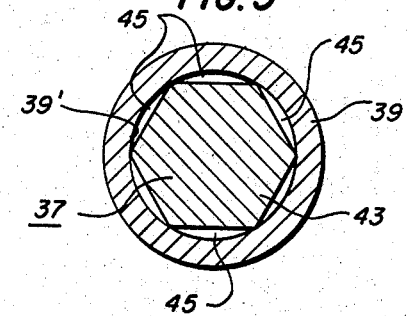

DEVICE FOR PREVENTING PRESSURE OR VACUUM BUILD-UP IN PNEUMATIC BRAKE SYSTEMS

BACKGROUND OF THE INVENTION

1. Field of the Invention

This invention relates generally to valve type devices for use in pneumatic systems.

2. Description of the Prior Art

The following U.S. patents are known to relate generally to the present invention: Gold, No. 481,727; Adams, No. 891,808; and Porter, No. 1,247,326. None of the above patents disclose or suggest the present invention.

In pneumatic brake systems such as used on tractor-trailer type trucks, air pressure frequently builds up in the pneumatic line between the pneumatic pump and the brake valves when the pneumatic pump is deactivated due to a number of reasons such as leaky pneumatic pumps and rises in temperatures. Such pressure build-up in the pneumatic system causes the pneumatic brakes to drag.

In addition, a vacuum frequently builds up in the pneumatic line when the temperature falls. Such a vacuum build-up causes the pneumatic brake system to operate unevenly.

SUMMARY OF THE INVENTION

The present invention is directed towards overcoming the problems and disadvantages of pressure and vacuum build-up in pneumatic brake systems. The concept of the present invention is to mount a body in the pneumatic line intermediate the pneumatic pump and the brake valves, the body having an air passage for allowing air to flow between the pneumatic pump and the brake valve through the pneumatic line and having air bypasses leading to air valves for allowing any pressure or vacuum build-up in the pneumatic line while the pneumatic pump is not activated to be relieved therethrough. The valves include air vents for allowing ingress and egress of air between the air bypasses and the atmosphere and include slide means for controlling the ingress and egress of air through the air vents by controlling the size of the air vents.

The present invention prevents any brake drag as a result of pressure build-up in the hydraulic lines, prevents any uneven braking forces as a result of vacuum build-up in the pneumatic lines, and increases the efficiency of the vehicle by preventing such brake drag and uneven braking forces.

BRIEF DESCRIPTION OF THE DRAWINGS

FIG. 1 is a side elevational view of the present invention shown diagrammatically mounted in a pneumatic brake system.

FIG. 2 is a enlarged sectional view of the present invention.

FIG. 3 is a somewhat diagrammatic view of a portion of the present invention showing the air passage between the slide portion and the housing of one of the valve means of the present invention.

DESCRIPTION OF THE PREFERRED EMBODIMENT

The device 11 of the present invention is for use in a pneumatic brake system for a tractor-trailer type truck which includes in general a pneumatic pump 13, a brake valve 15, and a pneumatic line 17 leading from the pneumatic pump 13 to the brake valve 15.

The device 11 includes a body means 19 for mounting in the pneumatic line 17 intermediate the pneumatic pump 13 and the brake valve 15 as shown diagrammatically in FIG. 1. The body means 19 includes a male end 19' and a female end 19''. The male and female ends 19', 19'' include screw threads or the like to allow the body portion 19 to be mounted in the pneumatic line 17. In other words, the pneumatic line is preferably provided with a female screw portion (not shown) for mating with the male end 19' of the body means 19 and a male screw portion (not shown) for mating with the female end 19'' of the body portion 19. The body means 19 includes an air passage 21 for allowing air to flow between the pneumatic pump 13 and the brake valve 15 through the pneumatic line 17. A first air bypass means 23 is provided in the body means 19 adjacent the air passage 21 for allowing ingress and egress of air into and out of the air passage 21. Preferably, a second air bypass means 25 is provided substantially opposite the air passage 21 from the first air bypass means 23 also for allowing ingress and egress of air into and out of the air passage 21. Preferably, the body means 19 includes a first valve chamber means 27 adjacent the first air bypass means 23 and includes a second valve chamber means 29 adjacent the second air bypass means 25. In other words, the first and second air bypass means 23, 25 are disposed substantially perpendicular to the air passage 21 and substantially 180° opposed to each other to allow ingress and egress of air between the air passage 21 and the first and second valve chamber means 27, 29. The first and second air bypass means 23, 25 may each consist of one or more openings between the air passage 21 and the first and second valve chamber means 27, 29. Preferably, each bypass means 23, 25 consists of two openings between the air passage 21 and the respective valve chamber means 27, 29 as shown in FIG. 3.

The device 11 includes first valve means 31 for mounting in the first valve chamber means 27 and, preferably, includes second valve means 33 for mounting in the second valve chamber means 29. The first and second valve means 31, 33 relieve any pressure or vacuum build-up in the air passage 21 of the body means 19 while the pneumatic pump 13 is not activated. Each valve means 31, 33 includes an air vent 35 for allowing ingress and egress of air between the first and second air bypass means 23, 25 and the atmosphere through the first and second valve means 31, 33 and includes slide means 37 for controlling the ingress and egress of air through the air vent means 35 by controlling the size of the air vent means 35 including reducing the size to zero, i.e., shutting off the air passage. Preferably, the air vent means 35 of the valve means 31, 33 are provided in a housing 39 that is complementary shaped with the first and second valve chamber means 27, 29 and preferably removably mounted therein by means of screw threads or by press fitting or the like. The slide means 37 of the first and second valve means 31, 33 include a conical-shaped head portion 41 for extending into the air vent means 35 to control the size thereof and thereby control the ingress and egress of air therethrough and include guide means 43 for keeping the conical-shaped head portions 41 aligned with the air vent means 35.

It will be noted that first valve chamber means 27 and second valve chamber means 29 are respectively tapered inwardly as at 27', 29' to provide stops for slide means 37 to prevent blocking of first and second air bypass means 23, 25 by the ends of slide means 37. Preferably, the guide means 43 consist of a polygonal body portion in which the edges thereof coact with the inner surface 39' of the housing 39 to guide the slide means 37 therein. As thus constructed, air passages 45 are formed between the sides of the polygonal body portion and the inner surface 39' of the housing 39 for allowing ingress and egress of air between the first and second bypass means 23, 25 and the atmosphere through the first and second valve means 31, 33.

The operation of the device 11 of the present invention is quite simple. When the pneumatic pump 13 is activated by a typical foot valve or the like, in a manner well known to those skilled in the art, air under high pressure is forced through the pneumatic line 17 and, consequently, the device 11. When this air under high pressure is forced through the device 11, it passes through the first and second air bypass means 23, 25 thereby forcing the slide means 37 of the first and second valve means 31, 33 outward completely closing the air vent means 35 preventing egress of air between the first and second valve means 31, 33 and the atmosphere. It will be understood that it takes a quick burst of air as when the brakes are applied, to close portions 41 against the seats 41'. Thus, this air under high pressure passes through the device 11 and continues to the brake valve 15 where it activates the brake valve 15 thereby stopping the vehicle. When the pneumatic pump 13 is deactivated, the slide means 37 of the first and second valve means 31, 33 are moved to an open position by momentary differential in pressure between the atmospheric pressure and the sudden drop in pressure in passage 21 when the brakes are released. In the event of a slow pressure increase in the pneumatic line 17 and air passage 21 due to a temperature rise or the like, air is allowed to egress through the first and second valve means 31, 33 into the atmosphere just slow enough to let the air bypass without closing the valve means 31, 33. Similarly, in the event of a pressure decrease in the pneumatic line 17 and the air passage 21 due to a temperature decrease or the like, air is allowed to ingress into the air passage 21 from the atmosphere through the first and second valve means 31, 33.

It should be noted that when the body means 19 is positioned on the pneumatic line 17 with the first and second valve chamber means 27, 29 in a vertical position, the slide means 37 of the first or second valve means 31, 33 that is in the bottom position will be forced to the closed position relative to the air vent means 35 due to the force of gravity even when the pneumatic pump 13 is deactivated. However, the other slide means 37 of the first or second valve means 33, 31 that is in the upper position will be moved to the completely open position relative to the air vent means 35 when the pneumatic pump 13 is deactivated thereby allowing the ingress and egress of air between the air passage 21 and the atmosphere. Thus, the performance of the device 11 is guaranteed by having the first and second valve means 31, 33 approximately 180° opposed to each other regardless of the relative position of the body means 19 to the pneumatic line 17. It will be noted that in FIG. 2 both the slide means 37 are shown in the open position disregarding any force of gravity. That is, the slide means 37 in FIG. 2 are shown as if the valve chamber means 27, 29 were in a horizontal position with the air pressure in the air passage 21 in equilibrium with the atmosphere.

Although the invention has been described and illustrated with respect to a preferred embodiment thereof, it is not to be so limited since changes and modifications may be made therein which are within the full intended scope of the invention.

We claim:

1. The combination with a pneumatic brake system having a pneumatic pump, a brake valve, and a pneumatic line leading from the pneumatic pump to the brake valve, of a device for preventing pressure or vacuum build-up in the pneumatic brake system when the pneumatic pump is deactivated, said device comprising:
  a. body means mounted in the pneumatic line intermediate the pneumatic pump and the brake valve, said body means including air passage means for allowing air to flow between the pneumatic pump and the brake valve through the pneumatic line, first and second valve chamber means substantially 180° opposed to each other, and first and second air bypass means between said air passage means and said first and second valve chamber means respectively for allowing ingress and egress of air between said air passage means and said first and second valve chamber means;
  b. first valve means mounted in said first valve chamber means of said body means for relieving pressure or vacuum build-up in said air passage means of said body means when the pneumatic pump is deactivated, said first valve means including housing means complementary shaped with said first valve chamber means, said housing means including air vent means for allowing ingress and egress of air between said first valve chamber means and the atmosphere, said first valve means including slide means for controlling the ingress and egress of air between said first valve chamber means and the atmosphere through said air vent means by controlling the size of said air vent means; and
  c. second valve means mounted in said second valve chamber means of said body means for relieving pressure or vacuum build-up in said air passage means of said body means when the pneumatic pump is deactivated, said second valve means including housing means complementary shaped with said second valve chamber means, said housing means including air vent means for allowing ingress and egress of air between said second valve chamber means and the atmosphere, said first valve means including slide means for controlling the ingress and egress of air between said second valve chamber means and the atmosphere through said air vent means by controlling the size of said air vent means.

2. The combination of claim 1 in which said slide means of said first and second valve means include conical-shaped head portions for extending into said air vent means to control the size thereof and thereby control the ingress and egress of air therethrough.

3. The combination of claim 2 in which said slide means of said first and second valve means include guide means for keeping said conical-shaped head portions aligned with said air vent means.

* * * * *